July 4, 1967  C. S. GARTRELL  3,328,835
CASING LINKING MACHINE FOR SAUSAGE AND THE LIKE
Filed Nov. 17, 1964  14 Sheets-Sheet 4

INVENTOR
CHARLES S. GARTRELL
BY Nolte & Nolte
ATTORNEYS

July 4, 1967 C. S. GARTRELL 3,328,835
CASING LINKING MACHINE FOR SAUSAGE AND THE LIKE
Filed Nov. 17, 1964 14 Sheets-Sheet 6

INVENTOR
CHARLES S. GARTRELL
BY Nolte & Nolte
ATTORNEYS

July 4, 1967  C. S. GARTRELL  3,328,835
CASING LINKING MACHINE FOR SAUSAGE AND THE LIKE
Filed Nov. 17, 1964  14 Sheets-Sheet 7
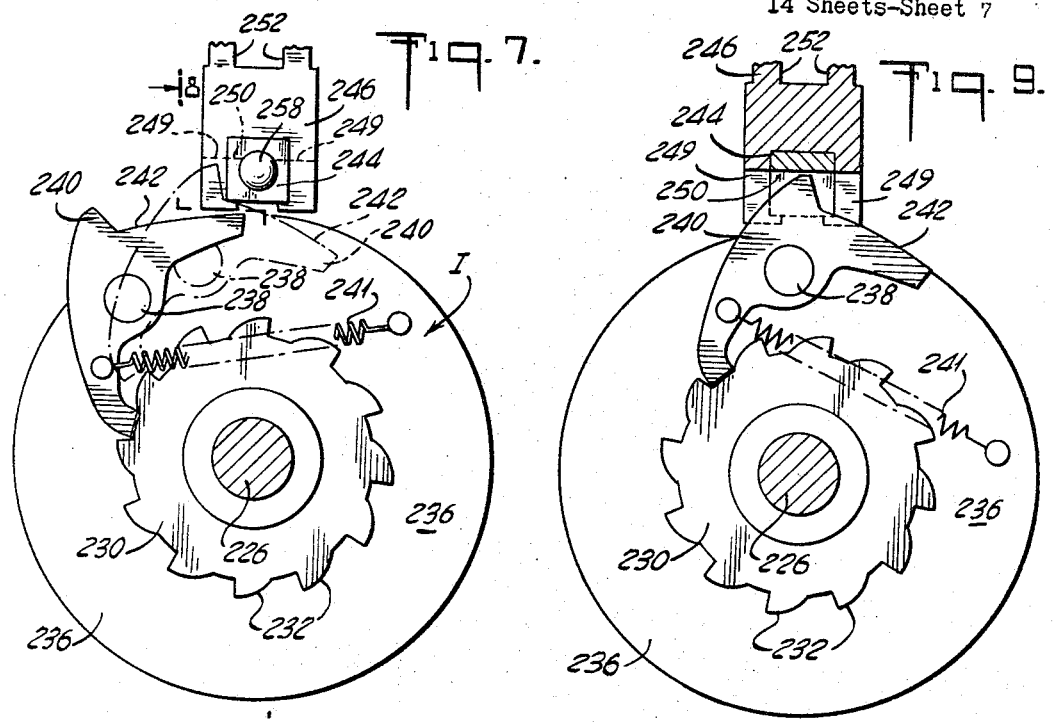
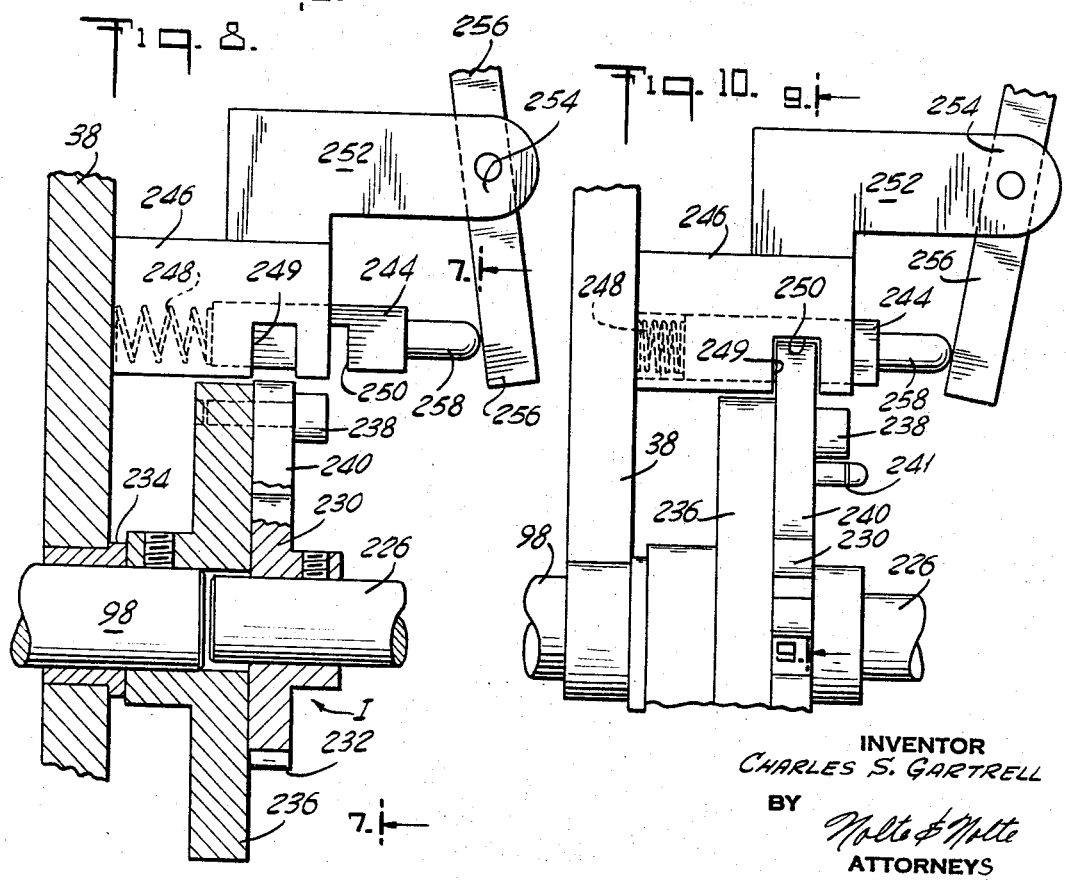
INVENTOR
CHARLES S. GARTRELL
BY
Nolte & Nolte
ATTORNEYS July 4, 1967   C. S. GARTRELL   3,328,835
CASING LINKING MACHINE FOR SAUSAGE AND THE LIKE
Filed Nov. 17, 1964   14 Sheets-Sheet 8
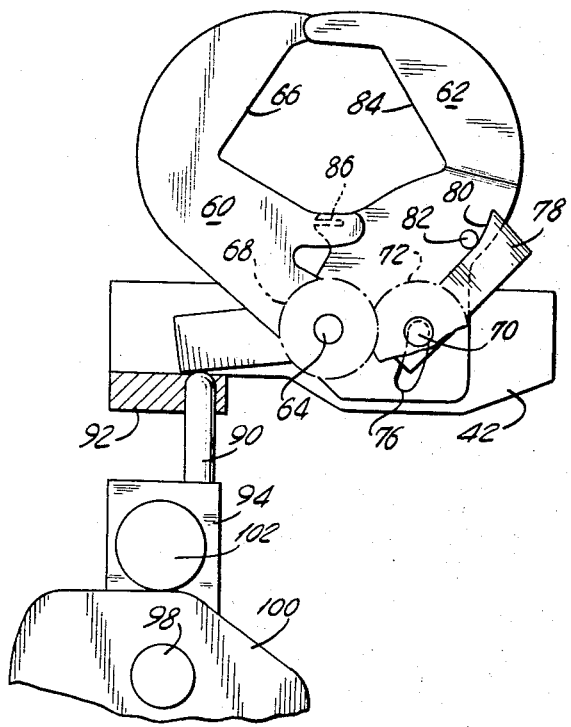
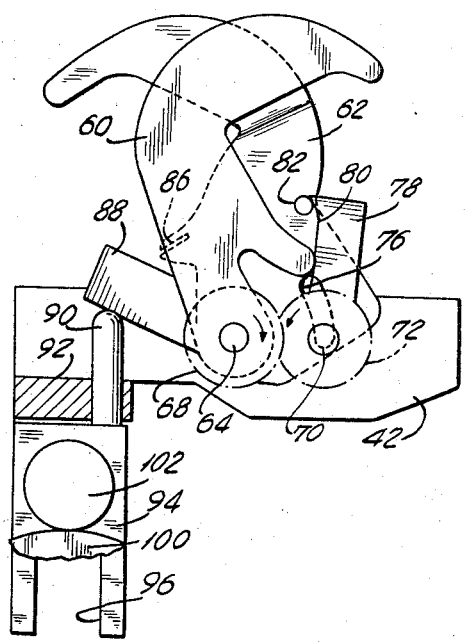
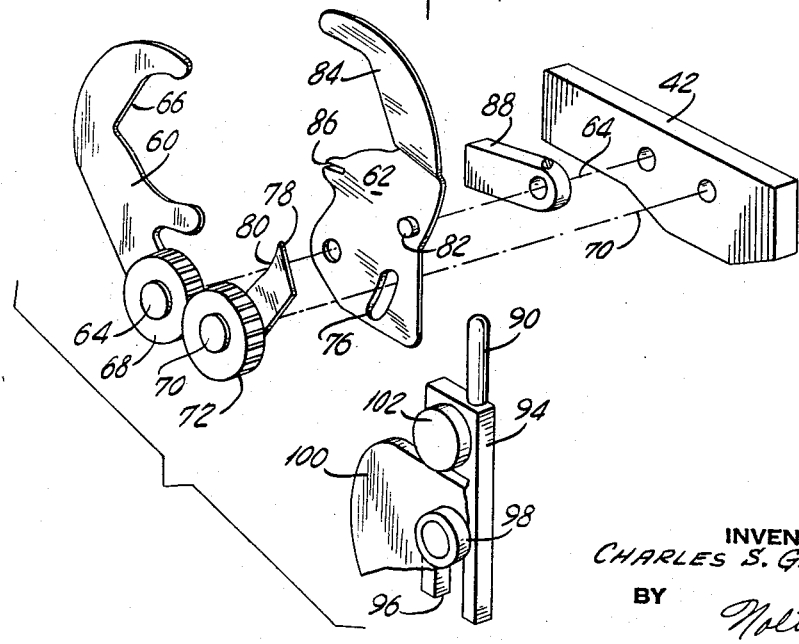
INVENTOR
CHARLES S. GARTRELL
BY
Nolte & Nolte
ATTORNEYS

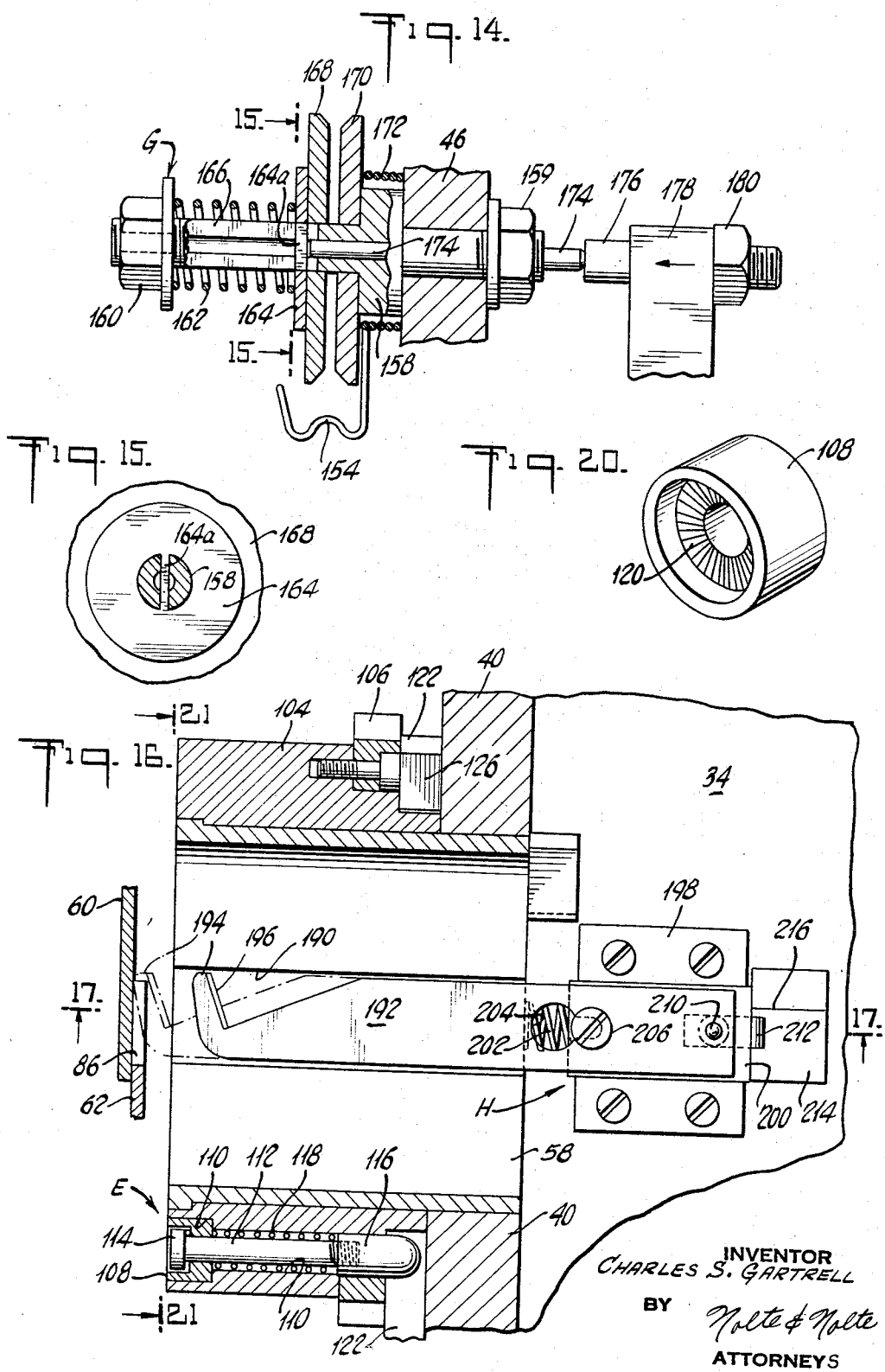

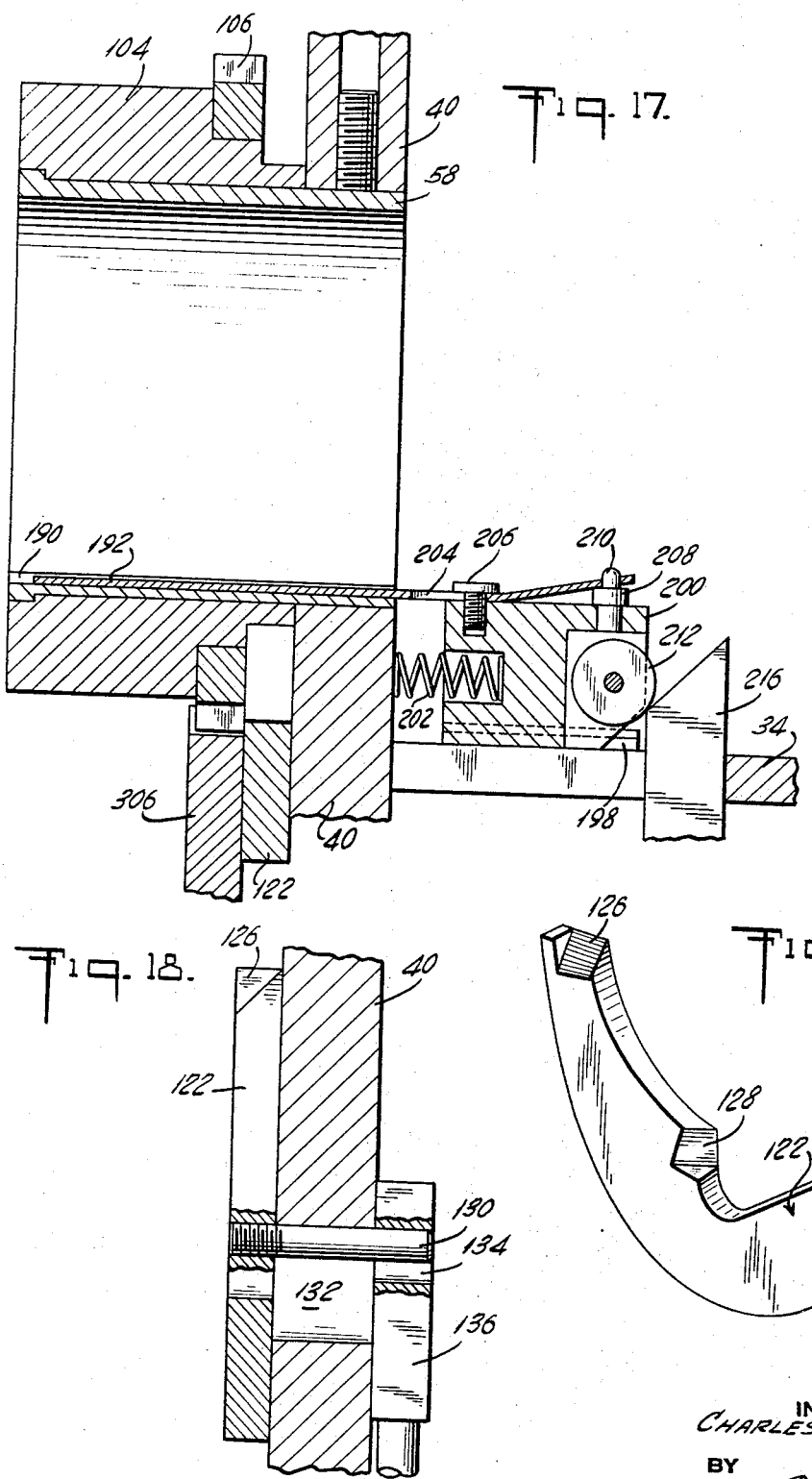

July 4, 1967  C. S. GARTRELL  3,328,835
CASING LINKING MACHINE FOR SAUSAGE AND THE LIKE
Filed Nov. 17, 1964  14 Sheets-Sheet 11

INVENTOR
CHARLES S. GARTRELL
BY Nolte & Nolte
ATTORNEYS

July 4, 1967  C. S. GARTRELL  3,328,835
CASING LINKING MACHINE FOR SAUSAGE AND THE LIKE
Filed Nov. 17, 1964  14 Sheets-Sheet 12

INVENTOR
CHARLES S. GARTRELL
BY
Nolte & Nolte
ATTORNEYS

July 4, 1967 C. S. GARTRELL 3,328,835
CASING LINKING MACHINE FOR SAUSAGE AND THE LIKE
Filed Nov. 17, 1964 14 Sheets-Sheet 13

INVENTOR
CHARLES S. GARTRELL
BY Nolte & Nolte
ATTORNEYS

United States Patent Office 3,328,835
Patented July 4, 1967

3,328,835
CASING LINKING MACHINE FOR SAUSAGE
AND THE LIKE
Charles S. Gartrell, Florham Park, N.J., assignor to
Linker Machines, Inc., Newark, N.J., a corporation of
New York
Filed Nov. 17, 1964, Ser. No. 411,887
13 Claims. (Cl. 17—34)

The present invention relates to machines used in the manufacture of edible products.

In particular, the present invention relates to machines which are adapted to be used during a stage in the manufacture of frankfurters, sausages, or the like.

As is well known, in the manufacture of edible products of this type it is conventional to fill a tubular flexible casing, which may be made of a synthetic or natural material, with an edible compressible emulsion which for the most part may be meat which has been comminuted, and in order to divide the prefilled casing into links it is necessary to constrict it at selected portions having a given distance from each other.

The present invention in particular deals with a machine of this type which is adapted for use in the manufacture of skinless frankfurters, sausages, or the like, so that the casing which is operated on with the structure of the invention is removed after the constricted casing has been divided into links of desired length and has been further processed before removal of the casing. The casing may be removed in the manner shown in U.S. Patent No. 2,800,681. This patent illustrates how the links can be treated after they are formed by the machine of the present invention.

In order to divide a prefilled casing into links of desired length it is necessary to constrict the casing at selected portions thereof while choking back the compressible edible emulsion therein, and then in order to maintain the constrictions in the casing it is necessary to wrap a string, thread, or the like around the constricted casing portions so as to maintain the constrictions in the casing during the subsequent processing thereof.

In the past considerable inconvenience has been encountered both in forming the constrictions in the prefilled casing and in wrapping a given length of string around the casing constrictions.

It is a primary object of the present invention to provide a machine which is partly automatic and which is capable of constricting a selected portion of the casing and wrapping a string around the selected portion thereof at least in part simultaneously with the constriction of the selected casing portion, the manual operations being limited to longitudinal shifting of the casing to situate selected portions successively at a constriction station of the machine and to manual starting of a cycle of operations which will result in constriction and wrapping of a given length of string around the constricted casing portion.

In particular it is an object of the present invention to provide a machine of this type which will automatically constrict and wrap a string around a selected casing portion while guaranteeing that the string is tightly wrapped around and will remain bound to the casing even though the string is not knotted. While the term "string" is used throughout the specification and claims it is to be understood that this term is intended to cover any type of thread, cord, or the like, which is suitable for use between the links of a prefilled sausage casing or the like.

It is furthermore an object of the present invention to provide a machine which will not only automatically wrap a string around the constricted portion of a prefilled casing, but which will in addition sever the wrapped string and automatically grip a new length of string preparatory to wrapping the new length of string around the next portion of the casing which is to be constricted.

The objects of the present invention also include the provision of a machine of the above type which enables the operator to easily and precisely select the desired lengths of the links.

Furthermore, it is an object of the present invention to provide for a machine of the above type a thin sharp blade to cut the string while at the same time guaranteeing that this blade will be properly supported during cutting of the string.

Also, it is an object of the present invention to provide for a machine of the above type a transmission which will reliably synchronize the operations of the various parts of the machine.

The objects of the present invention also include the provision of a machine of the above type which is exceedingly compact while at the same time composed of relatively simple rugged elements which are very reliable in operation.

Primarily the machine of the invention includes a positioning means which will position a prefilled casing with a selected portion thereof situated at a constricting station. A constricting means of the invention is located at this constricting station for first engaging and constricting the selected portion of the casing and for then releasing the casing, and the structure of the invention also includes a wrapping means which will wrap a string a given number of times around the constricted portion of the casing at least in part simultaneously with the constriction of the selected portion of the casing by the constricting means. An adjustable locating means is available to the operator for selecting the length of the links, and a one revolution clutch is also available to be actuated by the operator for transmitting the drive from a constantly rotating drive shaft to a main shaft which through a suitable transmission operates the constricting means. In accordance with a further feature of the invention the transmission which operates the constricting means transmits the drive through a second transmission to the wrapping means so as to cause the latter to wrap the string a given number of times around the constricted portion of the casing during the single revolution of the main shaft.

The invention is illustrated by way of example in the accompanying drawings which form part of this application and which:

FIG. 7 shows in elevation the one-revolution clutch of the invention, FIG. 7 being taken along line 7—7 of FIG. 5 in the direction of the arrows;

FIG. 8 is a longitudinal section of the structure of FIG. 7, taken along line 8—8 of FIG. 7 in the direction of the arrows;

FIG. 9 shows the one-revolution clutch just after it has been engaged, FIG. 9 being taken along line 9—9 of FIG. 10 in the direction of the arrows;

FIG. 10 shows the position which the structure of FIG. 8 takes when the operator has actuated the one-revolution clutch so as to engage the latter;

FIG. 11 is a front elevation, partly in section, of the constricting means of the invention;

FIG. 12 shows the structure of FIG. 11 in the constricting position thereof;

FIG. 13 is an exploded perspective illustration of the elements of FIGS. 11 and 12;

FIG. 14 is a longitudinal sectional view, on an enlarged scale as compared to FIG. 2, of the tensioning means of the invention, FIG. 14 being taken along line 14—14 of FIG. 2 in the direction of the arrows;

FIG. 15 shows a detail of the tensioning means of FIG. 14, in a fragmentary transverse section taken along line 15—15 of FIG. 14 in the direction of the arrows;

FIG. 16 is a sectional plan view taken along line 16—16 of FIG. 4 and showing the details of the severing assembly of the invention;

FIG. 17 is a longitudinal sectional illustration of the structure of FIG. 16, taken along line 17—17 of FIG. 16 in the direction of the arrow;

FIG. 18 is a fragmentary section taken along line 18—18 of FIG. 6 and showing the details of a camming structure for camming a string-gripping means of the invention into a non-gripping position;

FIG. 19 is a perspective illustration of the cam which actuates the string-gripping means of the invention;

FIG. 20 is a perspective illustration of a gripper bushing which forms part of the string-gripping means of the invention;

Figure 21:
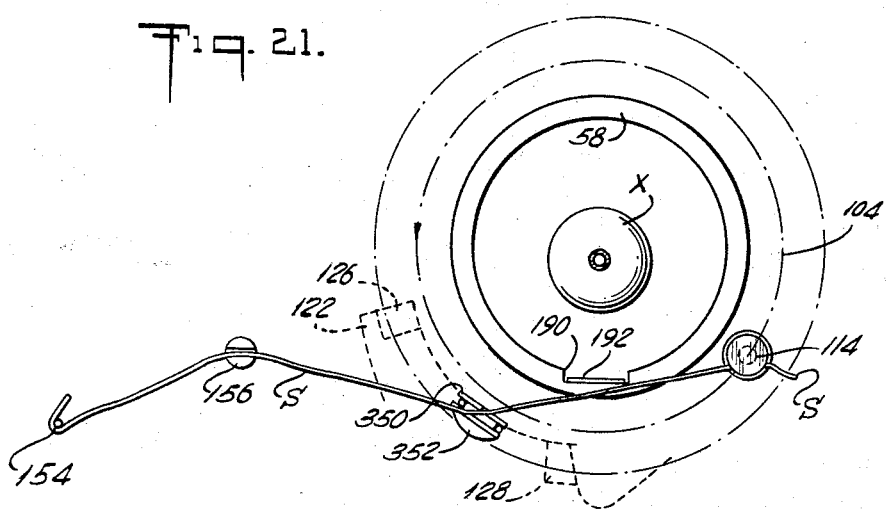
FIG. 21 is a front elevation of the wrapping assembly of the invention, taken along line 21—21 of FIG. 16 in the direction of the arrows.
Figure 22:
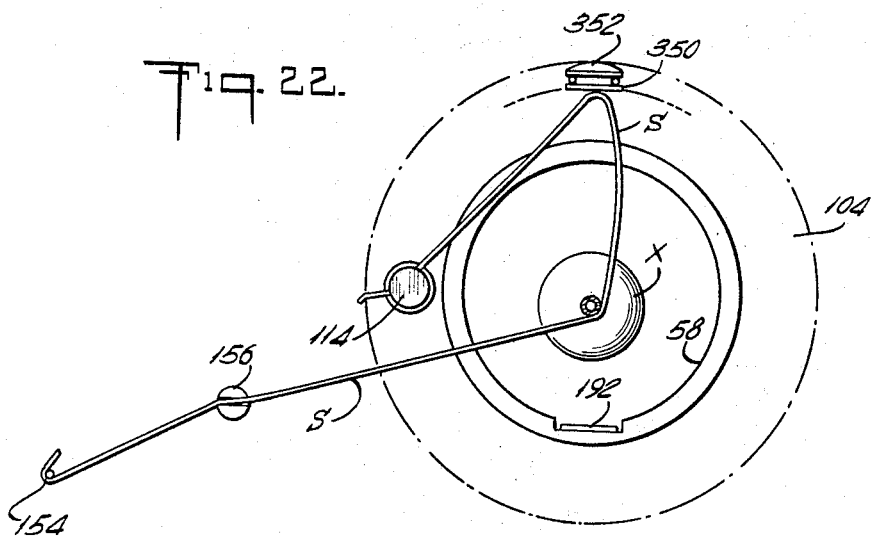
Figure 25:
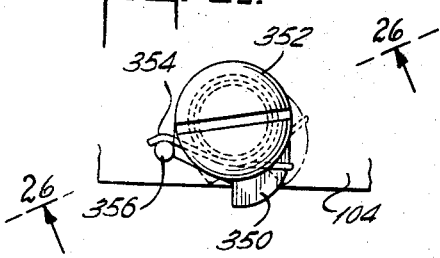
Figure 26:
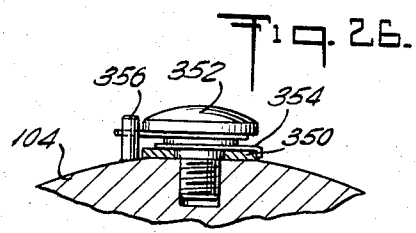
Figure 23:
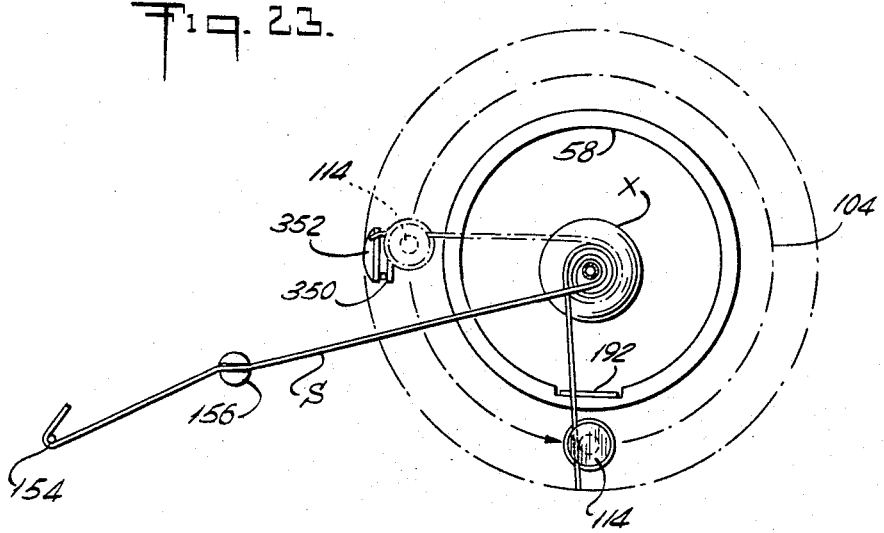
Figure 24:
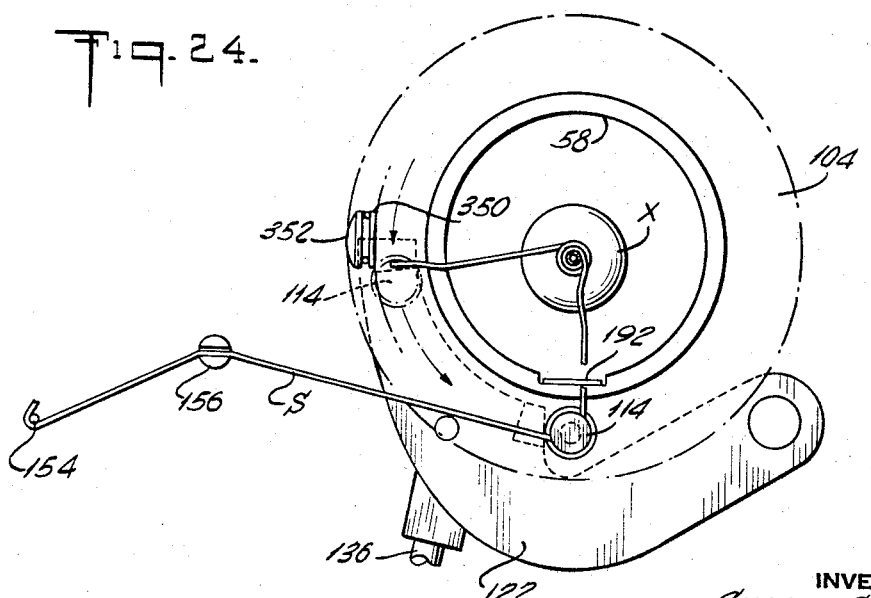
Figure 27:
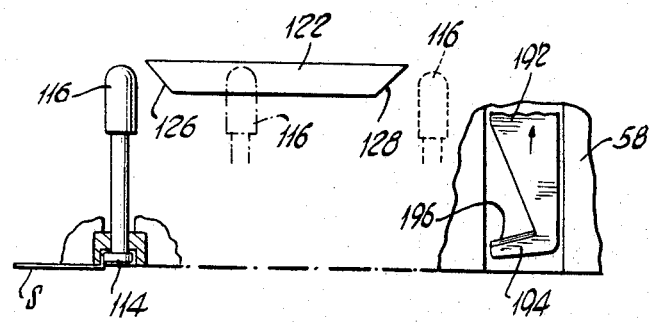
Figure 28:
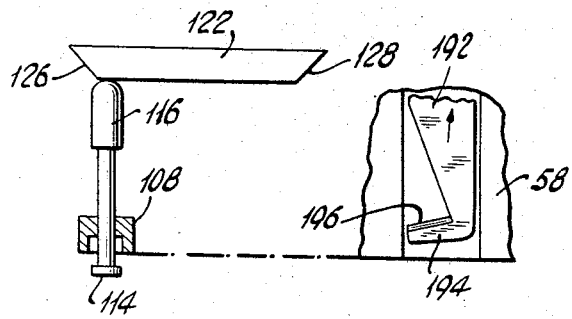
Figure 29:
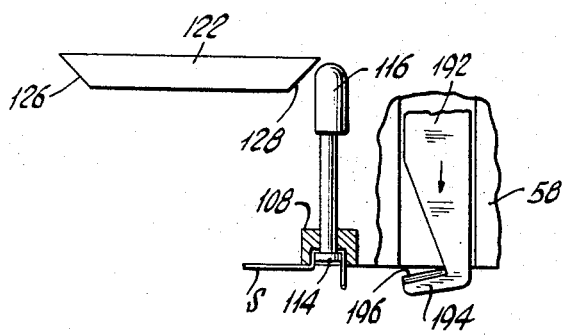
Figure 30:
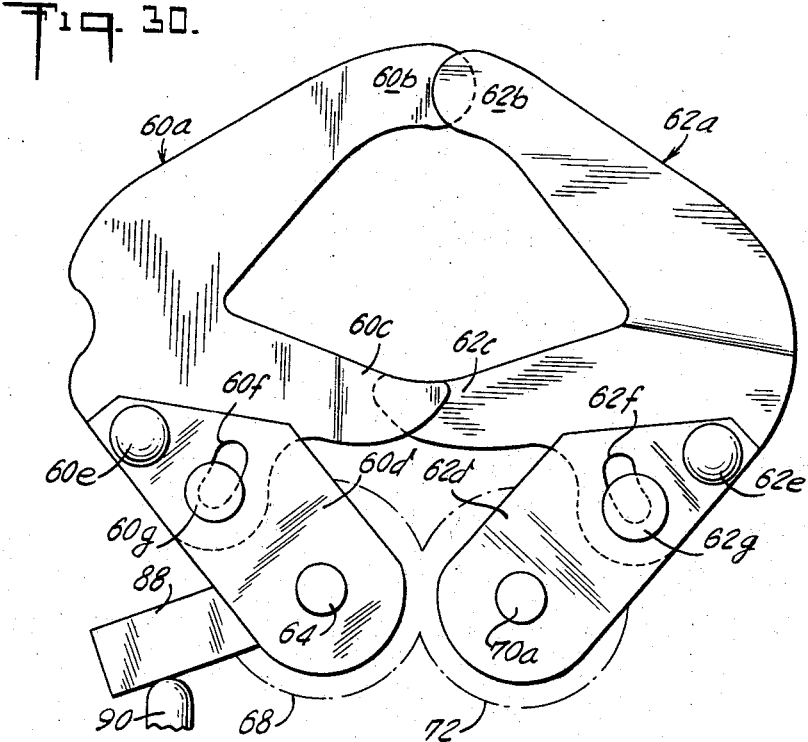
Figure 31:
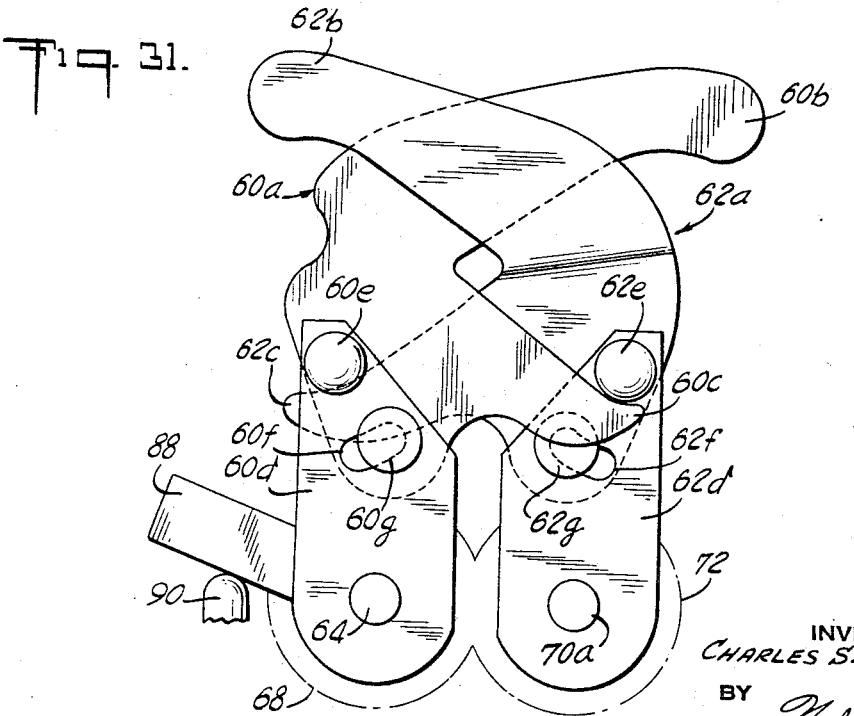

FIG. 22 diagrammatically illustrates the structure of FIG. 21 at a part of an operating cycle subsequent to that shown in FIG. 21;

FIG. 23 diagrammatically illustrates the structure of FIGS. 21 and 22 approaching the end of an operating cycle of the wrapping assembly;

FIG. 24 is a diagrammatic illustration of the string gripping and cutting structure almost at the end of an operating cycle in a position where the string is newly gripped and cut;

FIG. 25 shows a string-engaging member;

FIG. 26 is a sectional view of the structure of FIG. 25 taken along line 26—26 of FIG. 25 in the direction of the arrows;

FIGS. 27–29 respectively illustrate, in a diagrammatic manner, successive stages in the operation of the string gripping and cutting structure; and FIGS. 30 and 31 illustrate another embodiment of a constricting means in non-constricting and constricting positions, respectively.

Figure 1:
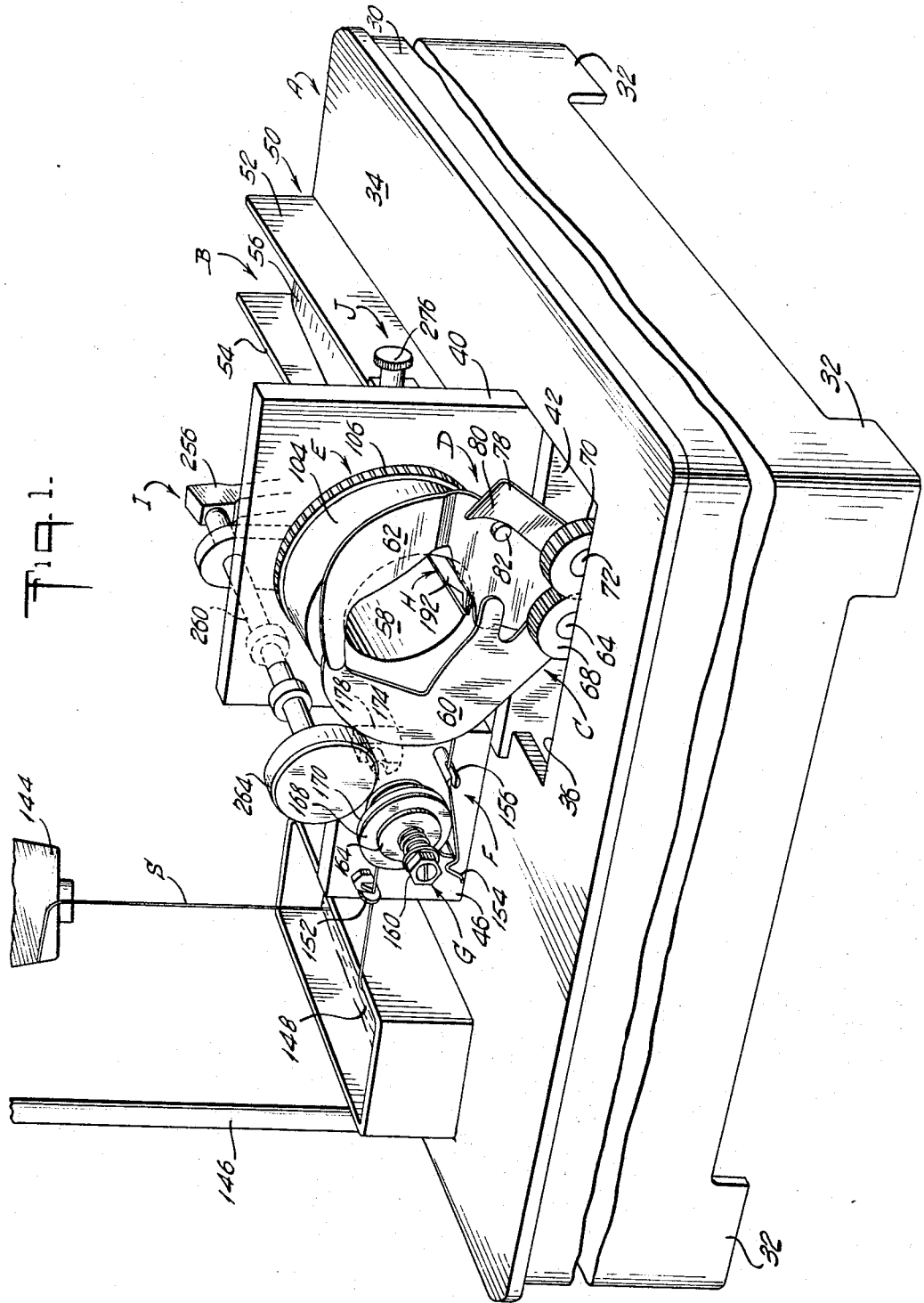
FIG. 1 is a perspective view of the machine of the invention as it appears at the front thereof where the operator of the machine is situated.
Figure 5:
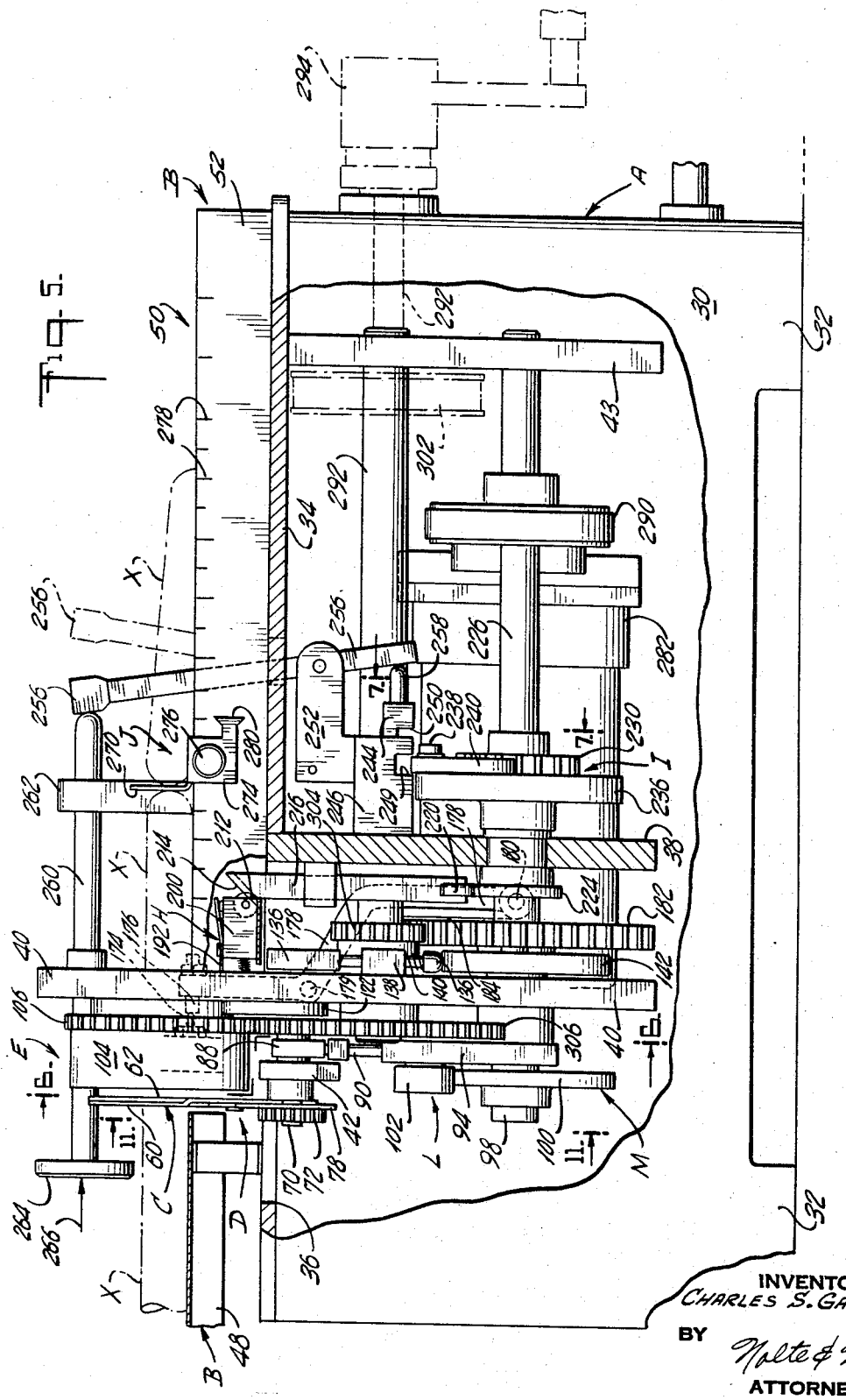
FIG. 5 is a side elevation of the machine of the invention with the outer housing thereof partly broken away to illustrate the driving structure.
Figure 6:
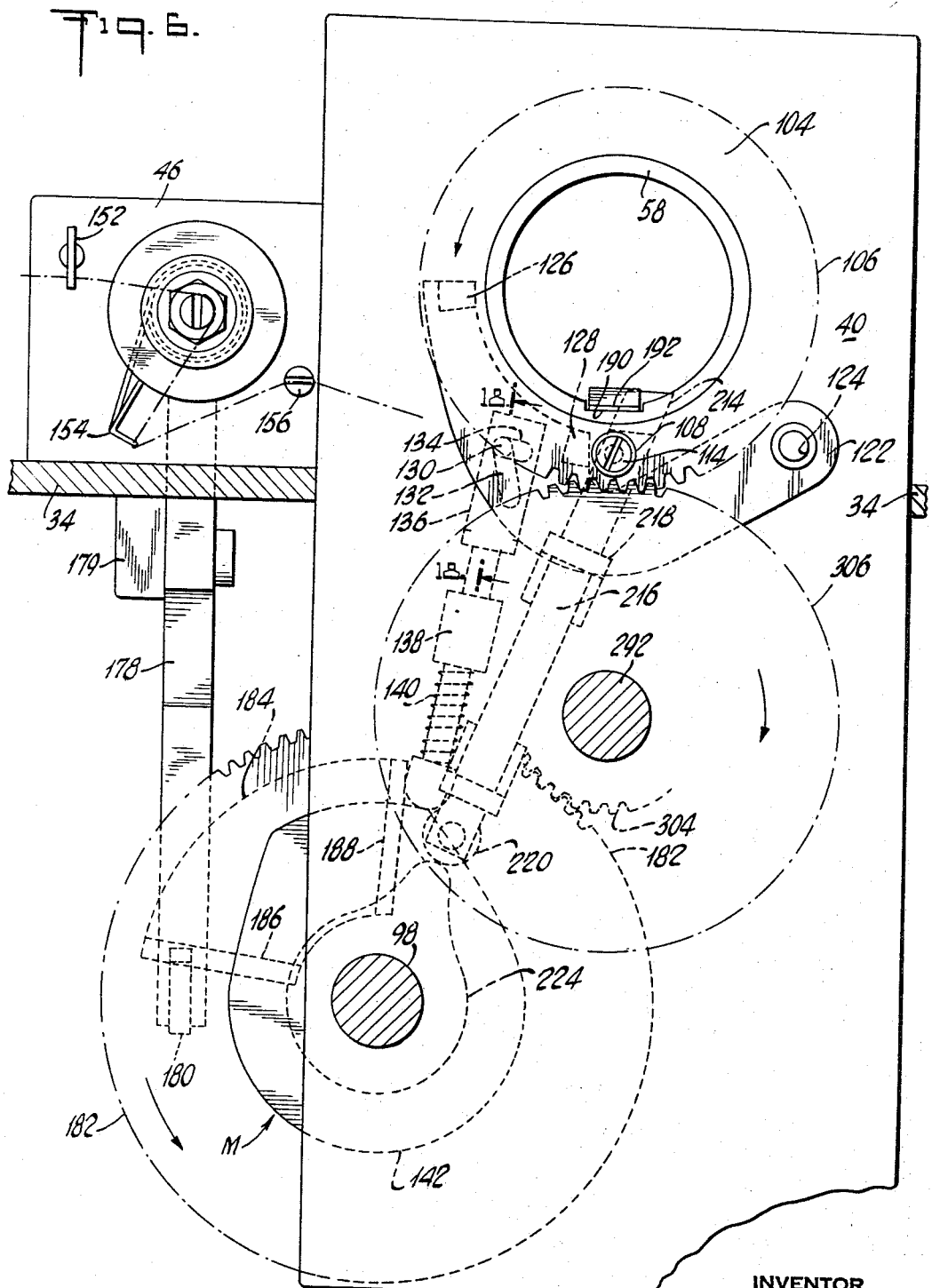
FIG. 6 is a partly sectional transverse view of FIG. 5 taken along line 6—6 of FIG. 5 in the direction of the arrows.

In general the machine of the invention includes a supporting framework A made up of a housing and various mounting plates described in greater detail below, this framework supporting the various components of the machine. A positioning means B, shown most clearly in FIGS. 1 and 5, is provided for positioning a selected portion of the prefilled casing X at a constricting station C which, as shown in FIGS. 1 and 5, has the constricting means D for constricting the casing at the constricting station C. A wrapping means E is also situated at the constricting station C for wrapping a string S a predetermined number of times around the constricted portion of the casing, this string being guided to the wrapping means by a guide means F. A tensioning means G is situated along the path through which the string is guided by the guide means F for tensioning the string after an initial part of an operating cycle of the wrapping means so as to tightly draw the turns of the string on the constricted portion of the casing. A severing or cutting means H, shown most clearly in FIG. 16, is provided for severing the string during the final portion of the operating cycle of the wrapping means E. A one-revolution clutch I is available to the operator to be manually actuated for starting an operating cycle of the machine, this clutch means I being indicated in part in FIG. 1 and also being illustrated in FIG. 5. A locating means J, indicated at the upper central part of FIG. 5, is capable of being adjusted by the operator for determining the lengths of links, in a manner described below. A drive means K is provided for continuously rotating a drive shaft, and the drive from the drive shaft is transmitted by the one-revolution clutch means I to a transmission means L which transmits the drive to the various components of the machine, and an assembly of control cams and transmission elements M, shown in FIGS. 5 and 6, is provided for bringing about the operation of the various components in proper sequence and synchronization.

Supporting framework

The supporting framework of the machine includes an outer housing 30 which has a generally rectangular configuration and which is provided at its lower portion with legs 32 situated at the corners of the housing 30 and adapted to rest on a suitable table, for example. The housing 30 has a top wall 34 which is formed with an opening 36 near the front of the top wall, as indicated in FIG. 5. The top wall 34 carries various mounting plates. Thus, this top wall 34 fixedly carries a mounting plate 38 which supports the main shaft for rotation, this shaft also being supported by an additional mounting plate 40 which is situated in front of and is parallel to the plate 38 and which extends through the opening 36 to the exterior of the machine above the top wall 34 of the housing 30. A smaller mounting plate 42 is situated in front of the mounting plate 40 and is also fixedly carried by the top wall 34 of the housing 30, this mounting plate 42 extending across the opening 36. A rear mounting plate 43 is situated in the housing and is fixed to wall 34. As may be seen from FIG. 1, the plate 34 which forms the top wall of the housing 30 also fixedly carries at the exterior of the machine a vertical mounting plate 46 which serves to support the tensioning means G as well as part of the string guide structure F.

Casing positioning means

The positioning means B (FIG. 5) for positioning the casing is situated on top of the top wall 34 of the housing 30 and includes, at the front of the machine, a suitable support 48 which can rest on the top wall, as indicated at the upper left portion of FIG. 5, and the positioning means further includes the elongated trough 50 which includes the sidewalls 52 and 54 shown in FIG. 1, the trough having an inclined bottom wall 56 situated between the sidewalls 52 and 54.

The mounting plate 40 is formed above the wall 34 with a circular opening in which a tubular cylindrical bushing 58 is fixed, this bushing being shown most clearly in FIG. 16, and the casing X extends from the support 48 through the bushing 58 along the interior of the channel 50.

Constricting means

As has been indicated above, the constricting means D of the invention is situated at the constricting station C. This constricting means D includes a pair of notched overlapping plates 60 and 62 which are formed with notches which together define a passage through which the casing X, shown in FIG. 5, passes, this constricting means D being situated just in front of the bushing 58. The details of one embodiment of a constricting means D are shown most clearly in FIGS. 11–13, while a second embodiment is illustrated in FIGS. 30 and 31.

Referring to FIGS. 11–13, it will be seen that the mounting plate 42 turnably supports a rotary shaft 64 on which both of the constricting plates 60 and 62 are supported, so that these plates have a common turning axis. The notched plates act in the manner of a pair of scissors blades and may be made of any metal, plastic composition or the like. The plate 60, which is formed with the substantially V-shaped notch 66, is fixed with a gear 68 which is itself fixed to shaft 64, and the mounting plate 42 carries a pin 70 which is parallel to shaft 64 and on which a gear 72 is supported for rotary movement, this gear meshing with and being identical to the gear 68 so as to turn equally and oppositely to the gear 68. The blade 62, while formed with the opening 74 through which the shaft 64 passes to support the blade 62 for turning movement coaxially with the blade 60, is also formed with an arcuate slot 76 whose center of curvature is in the common turning axis of the blades 60 and 62, and the pin 70 passes through the slot 76, so that in this way the blade 62 can turn with respect to the blade 60 in response to rotation of the gear 72. For this purpose the gear 72 fixedly carries a lever 78 which turns with the gear 72 and which at its upper edge 80 engages a pin 82 fixedly carried by the blade 62. Thus, with this construction when the gear 68 turns, it will turn the gear 72 so that the lever 78 will, with its edge 80, turn the pin 82 so that the blade 62 will turn equally and oppositely to the blade 60, and the V-shaped notch 84 of the blade 62 will cooperate with the V-shaped notch 66 to constrict the casing when the blades have with respect to each other the position illustrated in FIG. 12. The blade 62 is formed with a relatively narrow slot or notch 86 for a purpose described below.

In order to operate the blades 60 and 62, the shaft 64 is supported for rotary movement in the mounting plate 42 and fixedly carries a lever 88 which engages the top end of a pin 90 which is guided through an opening of an extension 92 of the mounting plate 42, and this pin 90 is fixed to and extends upwardly from a plate 94 which is formed at its lower portion with a notch 96 extending upwardly from the bottom end of the plate 94 and receiving the rotary main shaft 98 which is driven in a manner described below. This main shaft 98 fixedly carries one of the cams 100 of the camming and control assembly M, and the camming edge of the cam 100 engages a follower roller 102 which is supported by the plate 94. Thus, as the shaft 98 turns the cam 100 will turn therewith and by engaging roller 102 will raise the plate 94 so that the pin 90 will move upwardly to turn the lever 88 and the shaft 64 therewith so as to bring about the operation of the constricting means D in the manner referred to above. Any suitable spring is connected to the lever 88 to urge the latter downwardly into engagement with the top end of the pin 90.

Referring to FIGS. 30 and 31, the constricting means illustrated therein includes a pair of blades 60a and 62a respectively corresponding to the blades 60 and 62 referred to above. In the embodiment of FIGS. 30 and 31, the notched blade 60a has upper and lower fingers 60b and 60c respectively situated behind and in front of the upper and lower fingers 62b and 62c of the blade 62a.

The blade 60a is carried by a lever 60d which is fixed to the shaft 64 which is identical with the abovedescribed shaft 64 and which is turned in the same way through the lever 88 and the pin 90, this shaft 64 fixedly carrying the gear 68 which meshes with the gear 72 in the manner described above. The lever 60d carries a pivot pin 60e which serves to pivotally support the blade 60a on the lever 60d, and the lever 60d is formed with an arcuate slot 60f extending along a circle whose center is in the pivot axis provided by the pivot pin 60e and receiving the shank of a pin 60g which is fixed to the blade 60a and which has a head end situated in front of the slot 60f, so that the blade 60a is freely turnable about the axis of pivot 60e with respect to the lever 60d.

In the same way the blade 62a is carried by a lever 62d which in this embodiment is fixed to the shaft 70a which is fixed to the gear 72 and which is supported for rotary movement by the plate 42. The lever 62d carries a pivot pin 62e which serves to support the blade 62a for turning movement relative to the lever 62d, and this lever is formed with the arcuate slot 62f which extends along a circle whose center is in the pivot axis provided by the pivot pin 62e. A pin 62g has its shank extending through the slot 62f and fixed to the blade 62a, while the head end of the pin 62g is situated in front of the slot 62f, as shown in FIGS. 30 and 31.

With this embodiment, the blades are in their open position shown in FIG. 30 when the pin 90 is in its lower position. The raising of the pin 90, in the manner described above in connection with FIGS. 11–13, results in clockwise turning of the lever 88 so as to turn the shaft 64 and the gear 68 clockwise, and at the same time the gear 72 which meshes with the gear 68 will turn in a counterclockwise direction, as viewed in FIGS. 30 and 31, so that the levers 60d and 62d turn toward each other into the constricting position shown in FIG. 31. The blades 60a and 62a necessarily turn together with these levers, and as they engage the casing to constrict the latter the resistance provided by the casing itself will result in counter-clockwise turning of the blade 60a with respect to the lever 60d while the pin 60g advances to the right end of the slot 60f, as viewed in FIG. 31. In the same way the resistance of the casing to constriction by the blade 62a will result in turning of the latter in a clockwise direction relative to the lever 62d as viewed in FIG. 31, causing the pin 62g to advance to the left end of the slot 62f, as viewed in FIG. 31.

In this way the casing is constricted while at the same time the blades themselves have a limited extent of movement with respect to the levers 60d and 62d as a result of the freedom of the pins 60g and 62g to move respectively along the slots 60f and 62f. When the parts return from the constricting position of FIG. 31 to the non-constricting or rest position of FIG. 30, the blades 60a and 62a will turn relative to the lever 60d and 62d into the positions shown in FIG. 30, where the pins 60g and 62g are respectively located at the lower ends of the slots 60f and 62f, because the blades 60a and 62a have centers of gravity which urge them to turn downwardly to the positions shown in FIG. 30.

*Wrapping assembly*

The wrapping assembly E includes a rotary cylindrical member 104 (FIG. 16) supported for rotation by the bushing 58 in front of the mounting plate 40, and this rotary member 104 fixedly carries a gear 106 which is driven from the transmission means L in a manner described below. The rotary annular member 104 of the wrapping means carries a gripping means which includes a hollow gripping member 108. As may be seen from FIG. 16 the hollow gripping member 108 is seated in a stepped bore 110 of the rotary member 104, this bore extending parallel to the axis of the rotary member 104 completely through the latter. The gripping means includes a shiftable gripping member 112 having a head end 114 received in the hollow gripping member 108, and the stem of the movable gripping member 112 threadedly carries an operating end portion 116 which projects beyond the rear face of the gear 106. A spring 118 is situated within the bore 110 and engages the front face of the member 116 to urge the movable member 112 to its gripping position illustrated in FIG. 16. As may be seen from FIG. 20 the hollow gripping member 108 is provided at its interior with a knurled annular surface 120 to cooperate with the head 114 of gripping member 112 to reliably grip a string in a manner described in greater detail below.

As will also be apparent from the description below, the transmission means L is such that during movement of the constricting means D to and from its constricting position (shown in FIGS. 12 and 31), the rotary member 104 will be rotated a number of times about the casing, and a string which is held by the gripping means will therefore be wrapped a given number of times around the constricted portion of the casing.

The gripping means is moved to a non-gripping position during a final portion of its operating cycle by a substantially hook-shaped wedging cam 122 shown most clearly in FIG. 19. The cam 122 is pivotally supported at its opening 124 on the mounting plate 40 (FIG. 6) and is adapted to enter into the space between the mounting plate 40 and the coplanar rear surfaces of the rotary member 104 and gear 106, so that the cam 122 has access to the operating end 116 of the gripping means. The cam 122 has a pair of ramps 126 and 128, and, as will be apparent from the description which follows, when the cam 122 is turned into the path of movement of the operating end 116 of the gripping means, this end will ride up the ramp 126 to move along the cam 122 and will then move down the ramp 128, as a result of the action of the spring 118, so that during movement along the cam 122 from the ramp 126 to the ramp 128 the gripping means will be held, in opposition to the spring 118, in its non-gripping position.

In order to turn the cam 122 to and from its position in the path of turning of the operating end 116 of the gripping means, the cam is fixed to a pin 130 (FIG. 18) which passes through a vertical slot 132 formed in the mounting plate 40, which is received in a horizontal slot 134 which is formed in a longitudinally movable control member 136 which is guided for longitudinal movement by any suitable bearing 138, indicated in FIG. 6, and a spring 140 engages the bearing 138 and a shoulder of the control member 136 to urge the bottom end thereof, which is convexly curved, into engagement with the peripheral camming edge of a rotary cam 142 which forms part of the control assembly M and which is fixed to the main shaft 98 for rotation therewith, as shown most clearly in FIG. 6.

The wrapping means also includes a string-engaging member 350 shown most clearly in FIGS. 25 and 26. The string-engaging member 350 is in the form of a substantially hook-shaped plate formed with an opening through which a pivot pin 352 extends. This pivot pin is threaded into a suitably threaded bore formed in the exterior of the rotary member 104, as shown most clearly in FIGS. 25 and 26, so that the string-engaging member 350 is supported for turning movement about an axis which is perpendicular to the axis of the rotary member 104. A spring 354 is coiled about the pin 352, has one end engaging a pin 356 which is fixed to the rotary member 104, and has an opposite end extending into a notch at the outer periphery of the string-engaging member 350, so that the spring 354 tends to urge the string-engaging member 350 to the position shown in FIG. 25, where the hook-shaped end thereof projects forwardly beyond the front face of the rotary member 104.

When the member 350 engages a string, the increase in the tension of the string during wrapping of the string around the constricted portion of the casing will act on the member 350 to turn the latter in opposition to the spring 354 until the member 350 assumes a dot-dash line position indicated in FIG. 25 where the tip of the hook-shaped end of member 350 is turned back to a location flush with the front face of the rotary member 104. At this point, the string slips from the string-engaging member 350 during the continued wrapping of the string around the casing, as is described in greater detail below.

*String guide means*

Figure 2:
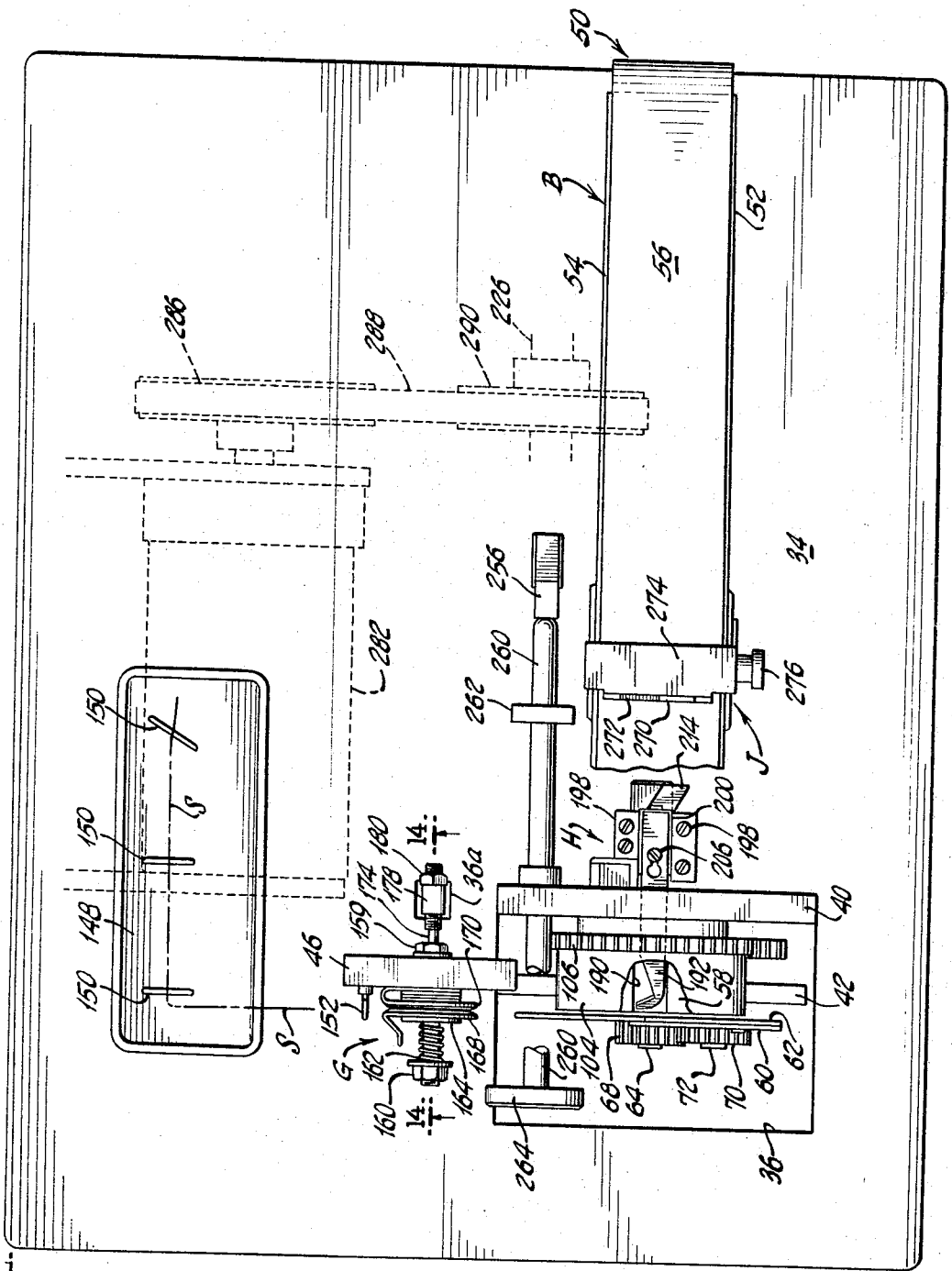
FIG. 2 is a top plan view of the machine of FIG. 1.

As has been indicated above, the structure includes a guide means F for guiding the string S to the wrapping means E. The string S (FIG. 4) is derived from a suitable string supply 144, in the form of a suitable package or bobbin on which the string has previously been wound in a well-known manner, and the supply 144 is supported from a suitable rod 146 or the like, carried by the top wall 34 of the housing 30 in the manner shown most clearly in FIG. 4. From the supply 144 the string extends into a bath 148 which contains a liquid, such as water, as well as suitable eyes, hooks or the like 150 (FIG. 2) extending upwardly from the bottom wall of the liquid bath 148 and serving to guide the string through the liquid bath so that the string will be wet before it reaches the casing. From the liquid bath 148, which is fixed in any suitable way to the top wall 34, the string passes through a substantially hook-shaped guide 152 carried by the mounting plate 46 (FIG. 1), and then the spring is passed through the tensioning means G around a springy hook member 154 and through a slotted guide member 156 to the gripping means.

*Tensioning means*

The tensioning means G is carried by the mounting plate 46 and is shown most clearly in FIG. 14. Thus, referring to FIG. 14, it will be seen that the mounting plate 46 is formed with a bore through which passes a reduced threaded portion of an elongated axially bored rigid member 158 held on plate 46 by a nut 159. This threaded member 158 carries a nut 160 which bears against one end of a coil spring 162 coiled around the member 158 and pressing also against a washer 164. This washer closely surrounds an elongated portion of the shaft 158 which is formed with a transverse slot 166 passing therethrough, and the washer 164 has a transverse rib 168 (FIG. 15) received in the slot 166 which passes through the member 158. A movable tensioning member or plate 168 surrounds the elongated portion of the rigid member 158 and is fixed to the washer 164 for movement therewith. A stationary tensioning plate 170 is fixed against a shoulder of the member 158, and the springy guide member 154 has a coiled spring portion 172 compressed between the mounting plate 146 and the stationary tensioning member 170. The string passes between the tensioning members 168 and 170 and around the springy guide member 154, as pointed out above.

In order to control the tensioning means G, it is provided with an elongated control rod 174 which is slidable in the axial bore of member 158 and which with its left end, as viewed in FIG. 14, engages the central cross rib 168 of the washer 164. The right end of the control rod 174 is engaged by an end of a stud 176 which is threadedly carried in a bore of a lever 178 and which can be adjustably fixed in position by a lock nut 180. The substantially S-shaped lever 178 is pivoted on a bracket 179 carried by wall 34 (FIG. 6) and extends through the opening 36 of the top wall 34 of the housing 30, as shown most clearly in FIG. 5. At its bottom end the lever 178 supports for rotation a roller 180, shown in dotted lines in FIG. 6. This roller is adapted to engage the rear surface of a gear 182 of the transmission means L, and this rear surface of the gear 182 carries an arcuate cam 184 which does not extend through a complete circle, and which terminates at its ends in inclined ramps 186 and 188 adapted to engage the roller 180 for turning the lever 178 during rotation of the gear 182 so as to control the position of the control rod 174. The spring 164 acts through the washer 164 on the control rod 174 to push the latter against the adjusting stud 176 carried by the lever 178, and to urge the roller 180 carried by the lever 178 against the rear face of the gear 182, and of course against the cam 184.

*Severing means*

The severing means H, which serves to cut the string S after it has been wound about the constricted portion of the casing, is shown most clearly in FIGS. 5, 6 and 16. As is shown most clearly in FIG. 16, the bushing 58 is formed at its lowermost portion with a horizontal axial inner groove 190 in which a thin springy metallic cutting plate 192 is supported for sliding movement between the non-cutting position shown in solid lines in FIG. 16 and the cutting position shown in dot-dash lines in FIG. 16. The blade 192 has a substantially hook-shaped cutting end 194 provided with a cutting edge 196, and when it is displaced to its cutting position this end 194 is received in the narrow notch 86 which is formed in the blade 62 of the constricting means D. This blade 62 has returned to its rest position before the blade 192 is shifted to its cutting position, and in its cutting position the springy end 194 is received in the notch 86 and bears against the plate 60, so that in this way the constricting means D also functions to reinforce and lend rigidity to the cutting blade 192 when it is in its cutting position. Thus, an efficient cutting action against any movement of the cutting edge 196 can take place. With the constricting means of FIGS. 30 and 31 blade 192 is made sufficiently rigid to eliminate the need for a reinforcing notch.

The top wall 34 of the housing 30 fixedly carries a pair of guide members 198 between which a block 200 (FIG. 17) is guided, a spring 202 engaging the mounting plate 40 and extending into a recess of the slide block 200 to urge the latter rearwardly. The blade is formed with a keyhole slot 204 which receives the head 206 of a screw which is threaded into the block 200 and which has its shank located in the narrow rear part of the keyhole slot 204, so that in this way the head 206 maintains the blade 192 against the slide block 200. At its rear end the block 200 carries a pin 208 which has a small projection 210 passing through an opening at the rear of the blade 192 so as to deflect the rear end of the blade upwardly and thus cause the blade to reliably lie flat down against the flat bottom surface of the groove 190. The rear portion of the slide block 200 is formed with a recess in which a follower roller 212 (FIG. 17) is supported for rotary movement, and this roller 212 is in engagement with an inclined camming surface 204 of an elongated bar 216 which is guided for up and down movement and which is urged downwardly by any suitable spring which is not illustrated. Guide bearings 218 shown in FIG. 6 are fixed in an unillustrated manner to the mounting plate 38, which is shown in FIG. 5, and these guides 218 guide the bar 216 for up and down movement. Bar 216 rotatably carries, at its lower end, a cam follower roller 220 which bears against the periphery of a cam 224 fixed to the main shaft 98 for rotation therewith, as shown most clearly in FIG. 6. Thus, during rotation of the main shaft the bar 216 will move up and down, and it is shown in FIG. 6 almost in its uppermost position where it has partly displaced the blade 192 forwardly toward the dot-dash line cutting position illustrated in FIG. 16. Of course, when the cam 224 is turned substantially beyond the position shown in FIG. 6, the unillustrated spring will urge the bar 216 downwardly, and then the spring 202 will retract the blade to its rest position. Thus, the bar 216, together with the cam 224 coact with the severing means formed by the blade 192 to act as a means for maintaining the latter stationary in its forward cutting position at least temporarily during the actual cutting of a string, whereupon the blade will then be retracted by the spring 202 back to the non-severing position.

*One-revolution clutch*

The one-revolution, manually operable clutch means I is shown most clearly in FIGS. 1, 5, and 7–10. As may be seen from FIG. 5, the driving means K includes a drive shaft 226 which is supported for rotation by a mounting plate 43 of the framework A, and this shaft 226 carries at its left free end, as viewed in FIG. 8, a gear 230 having teeth 232 in the nature of ratchet teeth, as is apparent from FIG. 7. The main shaft 98 is coaxial with the drive shaft 226 and is supported for rotary movement by a bearing 234 carried by the mounting plate 38. This main shaft 98 fixedly carries a disc 236, and this disc carries a pivot pin 238 (FIG. 7) on which a pawl 240 is mounted for rotary movement. A spring 241 is fixed at one end to the pawl 240 and at its opposite end to the disc 236 to urged the pawl into engagement with the teeth 232 so that the latter can transmit rotation through the pawl 240 to the disc 236 and from the latter to the main shaft 98. This pawl 240 has a camming edge 242 which is cammed by an elongated camming member 244, guided in a suitable block 246 fixed to and extending rearwardly from mounting plate 38 and housing in its interior a spring 248 which urges the camming block 244 rearwardly to the position indicated in FIG. 8. This camming block 244 is formed with a notch 250 which is large enough to permit the pawl to pass through this notch, as indicated in FIG. 9, when the cam 244 has been shifted, in opposition to the spring 248, from the position of FIG. 8 to the position of FIG. 10. For this purpose the guide block 246 carries an extension 252 which has a bifurcated end portion 254 carrying a pivot pin which extends through a lever 256 which, below the pivotal support thereof, engages a pin 258 which projects rearwardly from and is fixed to the cam block 244. This lever 256 extends upwardly through a suitable opening in the top wall 34 of the housing 30, and at its top end engages the right free end of an elongated actuating rod 260 (FIG. 5) guided for movement in a suitable bushing which is mounted in an opening of the mounting plate 40 as well as through an opening of an additional mounting plate 262 which is carried by the top wall 34 of the housing 30. At its left end, as viewed in FIG. 5, which is accessible to the operator, the operating rod 260 carries a knob 264 which is accessible to the operator, and in order to actuate the clutch the operator need only momentarily push the rod 260 in the direction of the arrow 266 shown in FIG. 5. This momentary thrust on the rod 260 will turn the lever 256 in a lockwise direction to the dotted line position indicated in FIG. 5, with the result that the cam 244 will be shifted to the position indicated in FIG. 10, so that the spring 240 will now be able to turn the pawl 240 into engagement with the gear 230 which is constantly rotating with the drive shaft 226, during operation of the machine. This momentary thrust on the rod 260 by the operator is sufficient to permit the uppermost part of the pawl to pass through aligned notches 244 in the guide block 246 as well as through the cam notch 250 which is now aligned with notches 249. As soon as the pawl has moved slightly in a clockwise direction beyond the position shown in FIG. 9, the spring 248 will return the cam 244 to the position illustrated in FIG. 8. The momentary thrust by the operator on knob 264 is sufficient to permit pawl 240 to move through and beyond block 246. The gear 230 will of course continue to transmit the rotation of the shaft 226 to the disc 237 which will of course drive the main shaft 98. When the pawl 240 returns to the solid line position indicated in FIG. 7, it will again be close to the cam 244, which has returned to the position of FIG. 8, and the lower surface of the cam will now engage the camming surface 242 in order to cam the pawl 240 in opposition to the spring 241 away from the gear 230, the cam 244 engaging the shoulder 268 of the pawl 240 in order to cam the latter to the dot-dash line position indicated in FIG. 7, with the result that the shaft 98 stops turning after it has completed one revolution.

*Locating means*

The locating means J is adjustable to enable the operator to select the lengths desired for the links. This locating means J includes a member 270 (FIG. 2) which is formed with a V-notch 272 which opens upwardly so that a previously formed constriction can be received in the V-notch, as indicated in FIG. 5. This member 270 extends upwardly from a substantially U-shaped member 274 which straddles the walls 52 and 54 of the channel 50, which forms part of the positioning means B as indicated above, and thus this portion 274 enables the locating means J to be shifted to any desired location along the side walls 52 and 54 of the channel 50. At one side the member 274 carries a manually turnable set screw 276 which is capable of fixing the locating means J at a selected location along the side wall 52, and, as is apparent from FIG. 5, this side wall is formed with a scale 278 indicating various lengths of the links and cooperating with an edge 280 of the member 274 so that in this way the operator can adjustably fix the locating means at a selected location which is at a distance from the constricting station C indicated by the scale 278, and thus the operator can select the portion of the casing which will be constricted, so as to determine the length of the links.

Drive assembly

Figure 3:
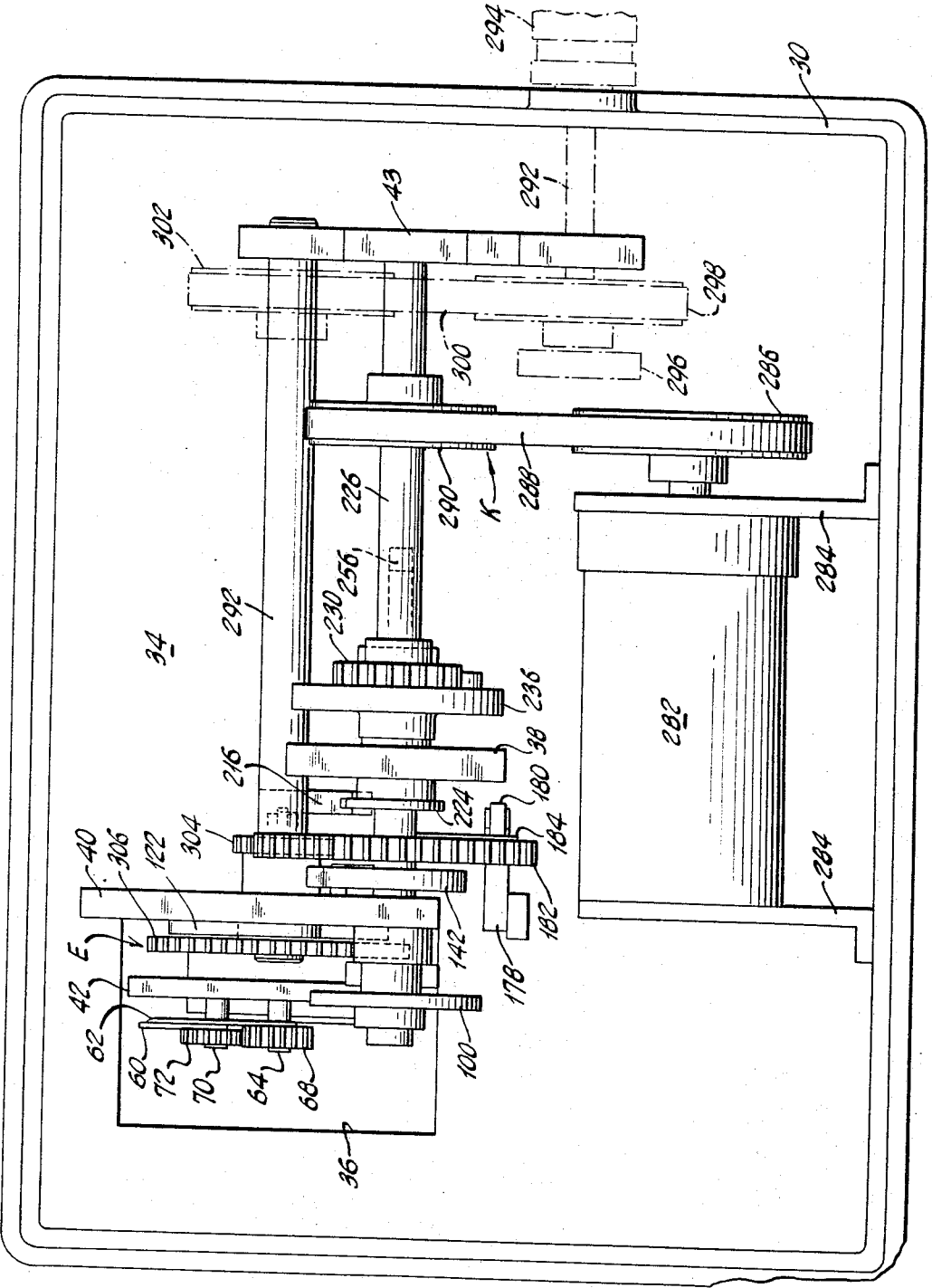
FIG. 3 is a bottom plan view of the machine as it appears from the underside, FIG. 3 illustrating details of the driving structure of the invention.

Referring to FIG. 3, it will be seen that the drive assembly K includes an electric motor 282 connected in any suitable way to a source of electricity which can be switched on and off by the operator, and during operation of the device the electric motor 282 is constantly running. It is supported by any suitable brackets 284 on a side wall of the housing 30 in the interior thereof, and the motor drives a pulley 286 which through a belt 288 drives a pulley 290 fixed to the drive shaft 226, so that in this way this shaft is constantly driven.

In a manner which is described below, the drive is transmitted by the transmission L to a second rotary shaft 292, and if desired a manual drive can be operatively connected to the shaft 292. For this purpose the mounting plate 43 supports for rotation a shaft 292 capable of being fixed at the exterior of the housing to a hand crank 294 shown only fragmentarily in FIG. 3 and indicated in dot-dash lines in FIG. 5, and this hand crank may be removed from and connected to the shaft 292 in any suitable way. The shaft 292 is also supported for rotation in a second mounting plate 296, which need not be used if this manual drive is not used, and fixedly carries a pulley 298 which drives a belt 300, which in turn drives a pulley 302 fixedly carried by the shaft 292, so that in this way the latter shaft can be manually turned, if desired, so as to enable the operator to manually check on the operation of and adjust the machine.

Transmission means

As was indicated above, the drive will be delivered through the one-revolution clutch means I to the main shaft 98. Also it has been indicated above that this main shaft 98 fixedly carries a gear 182 to the rear face of which is fixed the cam 184 which controls the tensioning means in the manner described above. The second shaft 292 carries a gear 304 which meshes with the gear 182, and it will be noted particularly from FIG. 6 that the gear 304 is of a considerably smaller diameter than the gear 182 with which it meshes. The shaft 292 also carries a gear 306 which meshes with the gear 106 which is fixed to the rotary member 104 of the wrapping means E. It will be noted that the gear 106 is of a smaller diameter than the gear 306. Thus, the transmission means L forms a 2-stage step-down transmission. The transmission ratio is such that the gear 106 and the rotary member 104 will turn through four revolutions during each revolution of the main shaft 98.

Control assembly

The control assembly M has been referred to in describing the other components above. Thus, this assembly includes, as shown in FIG. 6, the cam 224 which actuates the vertically movable bar 216 of the severing means. This cam is situated just in front of the mounting plate 38 between the latter and the gear 182 whose rear face carries the cam 184 for the tensioning means, this cam 184 also forming part of the control assembly. Between the mounting plate 40 and the gear 182 the main shaft 98 carries the cam 142 which acts on the member 136 which raises and lowers the wedging cam 122 which controls the gripping means and which is pivoted on the mounting plate 40 in the manner shown most clearly in FIG. 6. At its forward portion the main shaft 98 carries the cam 100 which controls the constricting blades. Finally, just behind this cam 100 is situated the member 94 which transmits the movement from the cam 100 to the lever 88.

Operation

Figure 4:
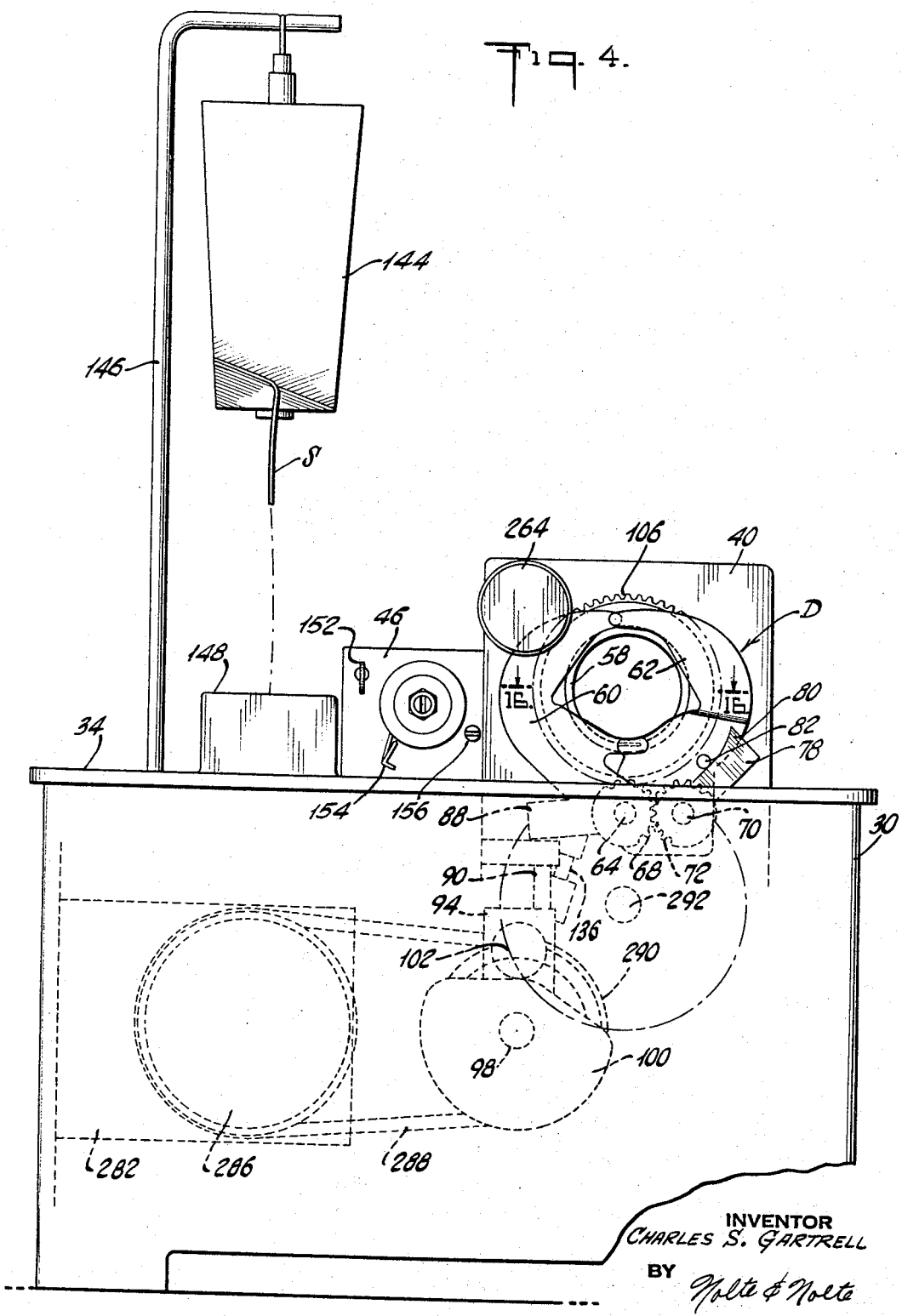
FIG. 4 is a front elevation of the machine of the invention.

At the start of the operations the cam 100 will have the position indicated in dotted lines in FIG. 4. It will be noted that the constricting plates are now fully open, and before a cycle of operations is started the operator will raise the prefilled casing X, shown in dot-dash lines in FIG. 5, and will move it through the open constricting plates and through the bushing 58 until the previously constricted portion is received in the V-notch of member 270 of the locating means J. This will position a preselected portion of the casing at the constricting station C. At this time the cam 184 (FIG. 6) is in engagement with the lever 178 so that the tensioning plate 168 is displaced forwardly from the tensioning plate 170 and the string S is therefore loose. It is, however, gripped by the gripping means 108, 114, as shown in FIG. 21 which illustrates the parts slightly after a cycle of operations has started. Of course, the knife blade 192 of the severing means is in its retracted position at this time.

With the prefilled casing S thus positioned to have a new constriction made therein, the operator will thrust the rod 260 forwardly so as to release the one-revolution clutch means I, and one revolution will be transmitted to the main shaft 98 in the manner described above. The result is that the cam 100 will turn in a counter-clockwise direction, as viewed in FIG. 4, and it will be noted that during approximately the first quarter of a revolution of the cam 100 the constricting plates 60 and 62 (or 60a and 62a) will be displaced to their constricting position while during the second and third quarters of this revolution these plates will be maintained in their constricting position by the circular periphery 300 (FIG. 4) of cam 100. During the last quarter of the revolution of cam 100 the constricting plates will return to their fully open position, which is reached by the constricting plates while the main shaft 98 continues to complete its single revolution which constitutes one operating cycle of the main shaft.

Simultaneously with these operations of the constricting means the transmission L rotates the rotary member 104 through three revolutions during the first three quarters of a revolution of shaft 98. At the end of three revolutions of the rotary member 104 the constricting plates will start to return to their fully open position. As may be seen from a comparison of FIGS. 21 and 23 the wrapping means will, during the three full revolutions, wrap the string S three times around the constricted portion of the casing while it is simutaneously constricted, and when the constricting blades have returned to their fully opened position the gripping means will have reached the dot-dash position indicated at the left part of FIG. 23. This is the position which the gripping means takes after 3¾ revolutions. During the first ¾ of the first revolution of rotary member 104, at the end of which it has the position shown in FIG. 22, cam 184 engages roller 180 to maintain the string S untensioned so that while member 350 turns from the position of FIG. 21 to that of FIG. 22 it will freely draw the string from supply package 144. After the first ¾ of the first revolution of member 104, the ramp 188 turns beyond roller 180 and thus the tension means is released to urge the plate 168 toward the plate 170 so as to tightly grip the string between these plates. Prior to his movement of he plate 168 the string could pass loosely through the space between the plates 168 and 170. During the subsequent plurality of revolutions of the wrapping means around the casing the string cannot be pulled from the string supply 144. The displacement of the ramp 188 beyond the roller 180 produces a holding and tensioning of the string by the tensioning means and as the gripping means rotates the string is wrapped around the casing and pulled from member 350. Experience has shown that after the first ¾ of the first revolution of member 104, there is just enough string to be wrapped tightly around the constricted portion of the casing the desired number of times.

FIG. 27 diagrammatically indicates the position of the cam 122 when it is situated out of the path of the operating end 116 of the gripping means. As is apparent from FIG. 6, where the structure is shown almost at the end of the single revolution of shaft 98 with blade 192 advanced to its cutting position, the outermost part of the throw of the cam 142 will displace the number 136 upwardly to its highest elevation so that the wedging cam 122 will be displaced during the last quarter of the last revolution of the wrapping means to the position indicated in FIG. 28 where the operating end of the gripping means is displaced forwardly so that the gripping means, when it has the dot-dash line position in FIG. 23, will start to release the string. As the wrapping means continues to rotate through its last quarter of its last revolution, which represents the final portion of an operating cycle of the wrapping means, the gripping means will move downwardly across the portion of string which extends from the constricted portion of the casing to the guide member 156, and furthermore at this time the string is still under tension so that it will be tightly wrapped around the casing. Furthermore, because the string is wet it will bind itself very tightly to the casing. Thus, the gripping means has been placed in its non-gripping position, has moved beyond one end of the string, and while still in its non-gripping position the gripping means will move downwardly across the portion of the string extending from the casing to the guide member 156 and will engage this portion of the string with shank 112 and displace it down to the substantially vertical position indicated in FIG. 24. By this time the cam 224 has reached the position indicated in FIG. 6 so that it has raised the bar 216 sufficiently to displace the knife 192 forwardly, and of course the contricting blades have returned to their rest position so that the free end of the knife blade is received in the notch 86 of the blade 62 in order to be reinforced thereby, with the constricting means of FIGS. 11–13. Furthermore, when the parts are in the position of FIG. 6, and 116 of the gripping means has moved beyond ramp 128 of cam 122 enabling the gripping means to have the position shown in FIG. 29 with respect to the cam 122, so that the string is now gripped and simutaneously the ramp 186 engages the roller 180 to release the tension of the tensioning means so that the string is now loose and can be pulled by the gripping means which rotates toward its end position which is between the bottommost position shown in FIG. 24 and the position indicated in FIG. 21. This movement causes the portion of the string extending between the gripping means and the casing X to pass across the cutting edge of the knife blade so that the string will be cut and a new portion of the string will already be gripped for movement almost up to the position of FIG. 21 when the parts are in their rest position. Just before the end of the cycle bar 216 descends, the spring 202 retracts blade 192. Now the one-revolution clutch wil have reached the end of its rotation, and all the parts will stop turning. In this way a selected portion of the casing has been constricted and a length of the string has been tightly wrapped thereon.

The operator is now free to advance the casing again to locate the last-constricted portion in the notch of the locating member 270 and the above operations can be repeated.

What is claimed is:

1. In a machine for dividing tubular, flexible casings, which have been prefilled with a compressible emulsion, into links of predetermined length, positioning means for positioning a selected portion of the prefilled casing at a constricting station, constricting means located at said station for first constricting the casing at said selected portion thereof and for then releasing said casing, wrapping means also at said constricting station for wrapping a string around the casing at said selected portion thereof simultaneously with the constricting thereof by said constricting means, the constriction in said casing provided by said constricting means being retained therein by the string wrapped around the constricted portion of the casing by said wrapping means, severing means for cutting a string wrapped by said wrapping means about said casing, and means co-acting with said severing means for maintaining the latter stationary in a severing position while said wrapping means moves the string across said severing means for cutting the string.

2. In a machine for dividing a tubular flexible casing, which has been prefilled with a compressible emulsion, into links of desired length, positioning means for positioning the prefilled casing with a selected portion thereof situated at a constricting station, constricting means located at said station for first engaging and constricting said selected portion of said casing and for then releasing the casing so as to provide it with a constricted portion, wrapping means also located at said constricting station for wrapping a string, during a given operating cycle of said wrapping means, a predetermined number of times around the selected portion of the casing at least in part simultaneously with the constricting of said selected portion of said casing by said constricting means, and for drawing the string from a given string supply only during an initial part of said operating cycle, tensioning means for engaging the string between said supply and wrapping means during almost the entire remainder of said operating cycle of said wrapping means for tensioning the string and terminating the withdrawal thereof from said supply so that the string will be tightly wrapped on the constricted portion of the casing, and severing means for severing the string, between said tensioning means and the part of the string which has been wrapped on said casing, just prior to the termination of the operating cycle of said wrapping means.

3. In a machine for dividing a tubular flexible casing, which has been prefilled with a compressible emulsion, into links of desired length, positioning means for positioning the prefilled casing with a selected portion thereof situated at a constricting station, constricting means situated at said station for first constricting the selected portion of the casing and for then releasing the casing, to provide it with a constricted portion, a wrapping assembly also situated at said station for wrapping a string around the selected portion of the casing at least in part simultaneously with the constriction thereof by the said constricting means, said wrapping assembly including annular rotary means surrounding said casing and turning around the latter a given number of times during an operating cycle of the wrapping assembly and gripping means carried by said rotary means for rotation therewith, said gripping means having a gripping and a non-gripping position and when in the said gripping position gripping a string and wrapping the latter a given number of times around the selected portion of the casing simultaneously with the constriction thereof, a string supply, guide means guiding the string from said supply to the said gripping means, tensioning means engaging the string to tension the latter during an initial portion of the operating cycle of the wrapping assembly to terminate the withdrawal of the string from said string supply during almost the entire remainder of said cycle while simultaneously causing the turns of the string which are wrapped around the constricted portion of the casing to tightly grip the latter, camming means engaging said gripping means during said final portion of said operating cycle for camming the latter from said gripping to said non-gripping position thereof so that said gripping means will release the string while moving into engagement with a portion of the string extending from the constricted portion of the casing to said tensioning means, said camming means then releasing said gripping means for return to said gripping portion thereof to grip the thus-engaged portion of the string and said tensioning means then releasing its tension on the string so that during the final portion of said cycle said gripping means will resume withdrawal of the string from said supply while turning the newly gripped string portion through a given increment around the wrapped casing, and severing means cutting the string between the constricted portion of the casing and the gripping means, after the gripping means has gripped the new portion of the string and has almost completed the operating cycle of the wrapping assembly, so as to sever the string wrapped around the casing from the newly gripped string portion.

4. In a machine as recited in claim 3, a liquid bath situated along the path along which the string is guided by said guide means from said string supply to said gripping means, so that the string will be wet when wrapped around the casing.

5. In a machine for dividing a tubular flexible casing, which has been prefilled with a compressible emulsion, into links of desired length, positioning means for positioning a prefilled casing with a selected portion thereof situated at a constricting station, constricting means located at said station for first engaging and constricting said selected portion of said casing, to provide it with a constriction, and for then releasing the constricted casing, a wrapping assembly also located at said constricting station for wrapping a string a predetermined number of times around the constricted portion of the casing, said wrapping means including annular rotary means surrounding the casing for turning around the latter a given number of times at least in part simultaneously with the constricting of said casing by the constricting means, gripping means movable between gripping and non-gripping positions and carried by said rotary means for rotation therewith, said gripping means when in said gripping position gripping a string and wrapping the latter a given number of times around the constricted portion of the casing during rotation of said rotary means, guide means guiding the string from a given string supply to said gripping means so that the latter withdraws the string from said supply means during at least part of the wrapping of the string around the constricted portion of the casing, tensioning means located along the path along which the string is guided by said guide means and engaging the string for tensioning the latter during an operating cycle of said wrapping assembly to terminate the withdrawal of the string from the supply means and tighten the string on the casing during said cycle, first cam means engaging said gripping means and camming the latter to a non-gripping position during a final portion of said operating cycle so that said gripping means will then release the string and move into engagement with a portion of the string extending from the casing to said tensioning means to engage said means to engage said portion of said string, said cam means then releasing said gripping means for return to said gripping position to grip said portion of said string while said tensioning means simultaneously releases the string for continued withdrawal thereof from said string supply during the end of said final portion of said operating cycle, severing means shiftable between a severing and a non-severing position for severing the string between said gripping means and casing when said severing means is in said severing position thereof, and second cam means engaging said severing means for camming the latter from said non-severing into said severing position thereof, after the portion of the string has been gripped by said gripping means when the latter has been released by said first cam means, so that the string will be cut by said severing means while a new portion of the string will be gripped by said gripping means and extend from the latter past said tensioning means to said supply for being wrapped about the next selected portion of the casing which is to be constricted.

6. In a machine as recited in claim 5, a stationary bushing extending into and supporting said rotary means for rotation, said casing extending through said bushing, and said severing means being in the form of a knife blade guided by said bushing for shifting movement in a direction parallel to the axis thereof between said severing and non-severing positions.

7. In a machine as recited in claim 6, said constricting means, when in a non-constricting position, engaging said blade when the latter is in said severing position thereof for supporting said blade during the severing of the string by movement thereof past said blade during the final portion of said operating cycle.

8. In a machine for dividing a tubular flexible casing, which has been prefilled with a compressible emulsion, into links of desired length, a stationary bushing through which the casing is adapted to extend with a constricted portion thereof situated adjacent to said bushing, constricting means situated adjacent said bushing for constricting a portion of said casing, a rotary member carried by said bushing for rotation around the latter, gripping means for gripping and releasing a string, and said gripping means being carried by said rotary member for rotation therewith and having a gripping end projecting from one side of said rotary member and adapted to grip a string and an operating end projecting from the other side of said rotary member, a substantially hook-shaped cam situated at said opposite side of said rotary member, and support means for supporting said cam for movement into and out of engagement with said operating end of said gripping means, said cam when out of engagement with said operating end of said gripping means freeing the latter to wrap a string around a constricted portion of a casing, and said cam when displaced to a position in the path to said operating end engaging the latter to place said gripping means in a non-gripping position for releasing a string gripped thereby.

9. In a machine as recited in claim 8, said cam having a pair of inclined ramp portions along which said operating end of said gripping means rides during rotation thereof with said rotary member when said cam is situated in the path of turning of said operating end, for first placing said gripping means in said non-gripping position and for then releasing said gripping means for return to said gripping position thereof.

10. In a machine as recited in claim 3, a string-engaging member carried by said rotary means for temporarily engaging a string extending from said gripping means to said tensioning means.

11. In a machine as recited in claim 10, said string-engaging member being turnably carried by said rotary means, and a spring holding said string-engaging member in a string-engaging position until the tension in the string pulls the latter away from said string-engaging member while turning the latter to a string-releasing position in opposition to said spring.

12. In a machine for dividing tubular, flexible casing, which have been prefilled with a compressible emulsion, into links of predetermined length, positioning means for positioning a selected portion of the prefilled casing at a constricting station, constricting means located at said station for constricting the casing at said selected portion thereof, a wrapping assembly also situated at said station for wrapping a string around the selected portion of the casing at least in part simultaneously with the constriction thereof by said constricting means, said wrapping assembly including annular rotary means surrounding said casing and turning around the latter a given number of times during an operating cycle of the wrapping assembly, and string-gripping means carried by said rotary means for rotation therewith, said string-gripping means having a gripping and a non-gripping position and when in said gripping position gripping a string and wrapping the latter a given number of times around the selected portion of the casing simultaneously with the constriction thereof, camming means engaging said gripping means during the final portion of said operating cycle for camming the latter from said gripping to said non-gripping position thereof, so that said gripping means will release the string while moving into engagement with another portion of the string extending from the constricted portion of the casing, said camming means then releasing said gripping means for return to said gripping position thereof to grip the thus-engaged other portion of said string so that during the final portion of said cycle, said gripping means will turn the newly gripped string portion through a given increment around the wrapped casing, severing means movable between severing and non-severing positions, and means displacing said severing means from said non-severing to said severing position thereof when said gripping means has gripped said other string portion, and said severing means when in its severing position being situated in the path of movement of said other string portion by said string-gripping means during the final portion of said cycle, so that said other string portion will be severed by said severing means during the final portion of said cycle.

13. In a machine for dividing tubular, flexible casings, which have been prefilled with a compressible emulsion, into links of predetermined length, wrapping means for wrapping a string around the casing at a given portion thereof while said wrapping means operates through a given operating cycle, severing means for cutting a string wrapped by said wrapping means about said casing, and means coacting with said severing means as said wrapping means approaches the end of said operating cycle thereof for displacing said severing means from a non-severing position into a severing position where said severing means is situated in the path of movement of a string wrapped by said wrapping means about said casing for cutting the string as it is moved by said wrapping means.

References Cited

UNITED STATES PATENTS

| | | | |
|---|---|---|---|
| 661,073 | 11/1900 | Paulitschke et al. | 17—33 |
| 1,004,580 | 10/1911 | Lidback | 17—34 |
| 2,096,972 | 10/1937 | Matousek | 17—34 |
| 2,228,075 | 1/1941 | Demarest et al. | 17—34 |
| 2,406,163 | 8/1946 | Prohaska | 17—34 |
| 2,510,997 | 6/1950 | Noe | 17—34 |
| 2,663,982 | 12/1953 | Conti | 17—34 X |

LUCIE H. LAUDENSLAGER, *Primary Examiner.*

SAMUEL KOREN, *Examiner.*